(12) United States Patent
Clarkson et al.

(10) Patent No.: US 6,724,843 B1
(45) Date of Patent: Apr. 20, 2004

(54) METHOD AND APPARATUS FOR FAST DECODING IN A MULTIPLE-ANTENNA WIRELESS COMMUNICATION SYSTEM

(75) Inventors: Kenneth L. Clarkson, Madison, NJ (US); Wim Sweldens, New Providence, NJ (US); Alice Xiaozhou Zheng, Fremont, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/504,174

(22) Filed: Feb. 15, 2000

Related U.S. Application Data (60) Provisional application No. 60/158,472, filed on Oct. 8, 1999.

(51) Int. Cl.[7] .............................. H04B 7/10; H04L 1/02
(52) U.S. Cl. ..................... 375/347; 375/340; 375/341
(58) Field of Search ........................... 375/347, 261, 375/260, 259

(56) References Cited

U.S. PATENT DOCUMENTS 5,832,044 A * 11/1998 Sousa et al. ................. 375/347

OTHER PUBLICATIONS

B.M. Hochwald et al., "Unitary Space–Time Modulation for Multiple–Antenna Communications in Rayleigh Flat Fading," http://mars.bell–labs.com/, pp. 1–40, 2000.
B.M. Hochwald et al., "Systematic Design of Unitary Space– Time Constellations," http://mars.bell–labs.com/, pp. 1–26, 2000.
B.M. Hochwald et al., "Differential Unitary Space–Time Modulation," http://mars.bell–labs.com/, pp. 1–27, Mar. 2000.
V. Tarokh et al., "A Differential Detection Scheme for Transmit Diversity," http://mars.bell–labs.com/, pp. 1–15, 2000.

J. Foschini, "Layered Space–Time Architecture for Wireless Communication in a Fading Environment When Using Multi–Element Antennas," Bell Labs Technical Journal, vol. 1, No. 2, pp. 41–59, 1996.
V. Tarokh et al., "Space–Time Codes for High Data Rate Wireless Communication: Performance Criterion and Code Construction," IEEE Transactions on Information Theory, vol. 44, No. 2, pp. 744–765, Mar. 1998.
V. Tarokh et al., "Space–Time Block Codes from Orthogonal Designs," IEEE Transactions on Information Theory, vol. 45, No. 5, pp. 1456–1467, Jul. 1999.
T.L. Marzetta et al., "Capacity of a Mobile Multiple–Antenna Communication Link in Rayleigh Flat Fading," IEEE Transactions on Information Theory, vol. 45, No. 1, pp. 139–157, Jan. 1999.

\* cited by examiner

*Primary Examiner*—Stephen Chin
*Assistant Examiner*—Curtis Odom (57) ABSTRACT

Received symbols are decoded in a multiple-antenna communication system using lattice-based decoding. The symbols are generated using a modulation constellation, e.g., a diagonal modulation constellation, and the constellation is characterized as a lattice for decoding purposes. For example, if a given communication link of the multiple-antenna communication system includes M transmitter antennas and a single receiver antenna, the diagonal modulation constellation can be characterized as a lattice in M dimensions. A differential decoding operation for received differential symbols involves a determination of the closest point in the lattice corresponding to the constellation. This determination may be made in an efficient manner using a basis reduction algorithm which generates an approximately orthogonal basis for the lattice, and then utilizes component-wise rounding to determine the closest point. The lattice-based decoding has a complexity which is polynomial rather than exponential in the particular number of antennas and the system rate, but is nonetheless able to deliver error rate performance which approximates that of maximum likelihood decoding.

24 Claims, 4 Drawing Sheets

| M | R | L | $[u_1\ u_2\ \cdots\ u_M]$ |
|---|---|---|---|
| 2 | 1 | 4 | [1 1] |
| 3 | 1 | 8 | [1 1 3] |
| 4 | 1 | 16 | [1 3 5 7] |
| 5 | 1 | 32 | [1 5 7 9 11] |
| 6 | 1 | 64 | [1 7 15 23 25 31] |
| 2 | 2 | 16 | [1 7] |
| 3 | 2 | 64 | [1 11 27] |
| 4 | 2 | 256 | [1 25 97 107] |
| 5 | 2 | 1024 | [1 157 283 415 487] |
| 6 | 2 | 4096 | [1 439 789 1539 1911 2015] |

```
proc reduce(i)
  if (i ≤ 1) return; fi
  while (TRUE) do
        reduce(i - 1);
```
$$\text{for } j \leftarrow i - 1 \text{ downto } 1 \text{ do } b_i \leftarrow b_i - \left\lfloor \frac{b_i \cdot \hat{b}_j}{\hat{b}_j^2} \right\rceil b_j \text{ od};$$

$$\hat{b}_i \leftarrow b_i;$$

$$\text{for } j \leftarrow i - 1 \text{ downto } 1 \text{ do } \hat{b}_i \leftarrow \hat{b}_i - \frac{\hat{b}_i \cdot \hat{b}_j}{\hat{b}_j^2} b_j \text{ od};$$

if $(\hat{b}_{i-1}^2 \leq 4/3(\hat{b}_i^2 + \alpha_{i,i-1}\hat{b}_{i-1}^2))$ then exit; fi
swap $b_i$ and $b_{i-1}$;

| M | R | $L=2^{RM}$ | $T^{ML}$ | $T^{latt}$ |
|---|---|---|---|---|
| 2 | 1 | 4 | .04 | .08 |
| 3 | 1 | 8 | .08 | .11 |
| 4 | 1 | 16 | .13 | .17 |
| 5 | 1 | 32 | .26 | .26 |
| 6 | 1 | 64 | .54 | .41 |
| 2 | 2 | 16 | .11 | .09 |
| 3 | 2 | 64 | .47 | .15 |
| 4 | 2 | 256 | 1.77 | .24 |
| 5 | 2 | 1024 | 7.49 | .39 |
| 6 | 2 | 4096 | 33.8 | .56 |
| 2 | 3 | 64 | .42 | .09 |
| 3 | 3 | 512 | 3.61 | .16 |
| 4 | 3 | 4096 | 27.6 | .23 |
| 5 | 3 | 32768 | 240 | .44 |
| 6 | 3 | 262144 | 2170 | .72 |

FIG. 8

METHOD AND APPARATUS FOR FAST DECODING IN A MULTIPLE-ANTENNA WIRELESS COMMUNICATION SYSTEM

PRIORITY CLAIM

The present application claims the priority of U.S. Provisional Application No. 60/158,472 filed Oct. 8, 1999 in the name of inventors K. L. Clarkson et al. and entitled "Reception Method for Multiple-Antenna Wireless Communication."

FIELD OF THE INVENTION

The present invention relates generally to wireless communication systems, and more particularly to decoding techniques for use in multiple-antenna wireless communication systems.

BACKGROUND OF THE INVENTION

Multiple-antenna wireless communication links allow much higher data rates than traditional single antenna links. Under the assumption that the fading coefficients between the different antennas are independent and known to the receiver, it has been shown in, e.g., J. Foschini, "Layered space-time architecture for wireless communication in a fading environment when using multi-element antennas," Bell Labs Tech. J., Vol. 1, No. 2, pp. 41–59, 1996, that the capacity of a multiple-antenna link scales linearly with the lesser of the number of send and receive antennas. Several techniques for modulation and coding over such channels have been proposed. See, e.g., V. Tarokh, N. Seshadri, and A. R. Calderbank, "Space-time codes for high data rate wireless communication: Performance criterion and code construction," IEEE Trans. Inf. Theory, vol. 44, pp. 744–765, 1998; and V. Tarokh, H. Jafarkani, and A. R. Calderbank, "Space-time block codes from orthogonal designs," IEEE Trans. Inf. Theory, vol. 45, pp. 1456–1467, July 1999.

In a mobile wireless environment, the fading coefficients change rapidly and the receiver may not have enough time to learn the fading coefficients. Even if the receiver does not know the fading coefficients, a substantial increase in channel capacity is still theoretically possible, as described in, e.g., T. L. Marzetta and B. M. Hochwald, "Capacity of a mobile multiple-antenna communication link in Rayleigh flat fading," IEEE Trans. Inf. Theory, vol. 45, pp. 139–157, 1999. Improved capacity can be achieved in this unknown channel case using so-called unitary space-time signals, such as those described in U.S. patent application Ser. No. 09/206,843, filed Dec. 7, 1998 and entitled "Wireless Transmission Method for Antenna Arrays Using Unitary Space-Time Signals," which is incorporated by reference herein.

A well-known technique for dealing with unknown channels in a single antenna setting is differential modulation. Recently, a multiple antenna differential modulation technique using unitary space-time signals was introduced in U.S. patent application Ser. No. 09/356,387, filed Jul. 16, 1999 and entitled "Method for Wireless Differential Communication Using Multiple Transmitter Antennas," which is incorporated by reference herein. The framework is formally similar to standard one-antenna differential modulation and connects the known channel case with the unknown channel case. In particular, this Application introduces so-called diagonal codes which are simple to generate, e.g., every antenna transmits a PSK symbol in turn.

A differential multiple antenna scheme that builds upon the orthogonal designs of the above-cited V. Tarokh et al. reference has also been proposed. The advantage of these orthogonal design differential codes is their good performance, and the fact that fast decoding algorithms exist. A significant disadvantage is that they only exist for a restricted number of antennas, while diagonal codes exist for any number of antennas. Even though diagonal codes are simple to generate, only a slow decoding algorithm has heretofore been available for such codes. This algorithm is unduly complex in that it is exponential in both the number of antennas and the rate.

A need therefore exists for improved techniques for decoding in multiple-antenna wireless communication systems.

SUMMARY OF THE INVENTION

The present invention provides lattice-based techniques for the fast decoding of diagonal modulation in a multiple-antenna wireless communication system. In accordance with the invention, received symbols are decoded in a multiple-antenna communication system using lattice-based decoding. The symbols correspond to points in a modulation constellation, e.g., a diagonal modulation constellation, and at least a subset of the constellation is characterized as a lattice for decoding purposes. For example, if a given communication link of the multiple-antenna communication system includes M transmitter antennas and a single receiver antenna, the diagonal modulation constellation can be characterized as a lattice in M dimensions. The decoding operation for the received differential symbols involves a determination of the closest point in the lattice corresponding to the constellation. This determination may be made in an efficient manner using a basis reduction algorithm which generates an approximately orthogonal basis for the lattice, and then utilizes component-wise rounding to determine the closest point.

The invention thus approximately recasts the decoding problem into that of finding the closest point in an integer lattice corresponding to at least a subset of a modulation constellation, such that a conventional basis reduction algorithm, e.g., the so-called LLL algorithm, can then be used to solve the latter problem in an efficient manner.

The invention can be used in conjunction with the decoding of differential or non-differential modulation. For example, in an application in which channel characteristics are known or it is otherwise desirable to utilize non-differential modulation, the lattice-based decoding techniques of the invention may be applied to the decoding of the resulting non-differential symbols.

It should also be noted that the lattice-based decoding techniques of the invention may be applied to only a subset of a modulation constellation, rather than to an entire constellation. In this case, the subset of the constellation may be characterized as a lattice with decoding performed using the lattice-based techniques of the invention, while other portions of the constellation are decoding using other techniques.

The invention provides a number of significant advantages over conventional decoding for multiple-antenna systems. For example, unlike conventional maximum likelihood decoding, the complexity of which is exponential in both the number of antennas and the rate, lattice-based decoding in accordance with the invention has a complexity which is polynomial in the number of antennas and the rate. Moreover, it will be shown herein that the error rate performance of the lattice-base decoding of the present invention is very close to that of conventional maximum likelihood decoding.

DETAILED DESCRIPTION OF THE INVENTION

The present invention provides lattice-based techniques for the fast decoding of diagonal differential modulation as well as other types of modulation in a multiple-antenna wireless communication system. An illustrative embodiment of the invention approximately recasts the differential decoding problem into that of finding the closest point in an integer lattice. A conventional basis reduction algorithm, e.g., the so-called LLL algorithm described in A. K. Lenstra, H. W. Lenstra, and L. Lovász, "Factoring polynomials with rational coefficients," Math. Ann., pp. 515–534, 1982, which is incorporated by reference herein, can then be used to solve the latter problem. Unlike conventional maximum likelihood decoding, the complexity of which is exponential in both the number of antennas and the rate, lattice-based decoding in accordance with the invention has a complexity which is polynomial in the number of antennas and the rate. It will also be shown herein that the performance of the lattice-base decoding of the present invention is very close to that of conventional maximum likelihood decoding.

The invention will be illustrated herein using differential modulation. It should be understood, however, that the invention can also be applied in systems which utilize other types of modulation, including non-differential modulation.

1. Single-antenna Differential Modulation

A brief description of single-antenna differential phase shift keying (DPSK) will now be provided so as to facilitate subsequent description of multiple-antenna differential modulation techniques. Differential modulation is traditionally used when the channel changes the phase of the symbol in an unknown, but consistent or continuously varying way. The data information is sent in the difference of the phases of two consecutive symbols. Under the assumption that the unknown fading coefficient changes little between two symbols, the difference in phase is preserved and can be used to carry data.

By way of example, assume a Rayleigh flat fading channel where the received signals are corrupted by additive noise and fading. Further assume that at time t we transmit the signal $s_t$ and we receive the noisy signal $x_t$ at the receiver antenna. The action of the channel is given by:

$$x_t = \sqrt{\rho} h_t s_t + w_t, \quad t=0, 1, \ldots \quad (1)$$

The additive noise $w_t$ is independent, identically distributed $C\mathcal{N}(0, 1)$ which is the complex Gaussian zero-mean unit-variance distribution. The complex-valued fading coefficient $h_t$ is $C\mathcal{N}(0, 1)$ distributed but not independent over time. We assume that the fading coefficients change continuously according to a model such as that described in W. C. Jakes, Microwave Mobile Communications, IEEE Press, Piscataway, N.J., 1993, which is incorporated by reference herein. The transmitted signals are normalized to have power one when averaged out over time, i.e., $E|s_t|^2=1$. Then $\rho$ represents the expected signal-to-noise ratio (SNR) at the receiver.

For a data rate of R bits per channel, we need $L=2^R$ symbols. A common technique is phase shift keying (PSK) which uses symbols that are Lth roots of unity $$v_l = e^{2\pi i l/L} \quad l=0, \ldots, L-1. \quad (2)$$

Suppose we want to send a data sequence of integers $z_1$, $z_2$, ... with $z_t \in \{0, \ldots, L-1\}$. The transmitter sends the symbol streams $s_1, s_2, \ldots$ where $$s_t = v_{z_t} s_{t-1} \quad t=1, 2, \ldots \quad (s_0=1). \quad (3)$$

The initial symbol $s_0=1$ does not carry any information and can be thought of as a training symbol. If we assume that the fading coefficient changes slowly so that $h_t \approx h_{t-1}$, the maximum likelihood (ML) decoder is given by $$\hat{z}_t^{ML} = \arg \min_l |x_t - v_l x_{t-1}|^2.$$

The above expression is equal to $$|x_t|^2 + |x_{t-1}|^2 - 2|x_t x_{t-1}|\cos(\arg x_t - \arg x_{t-1} - 2\pi l/L).$$

This expression is minimized by minimizing the argument of the cosine. Thus the maximum likelihood decoder can be computed as $$\hat{z}_t^{ML} = \lfloor \arg(x_t/x_{t-1}) L/(2\pi) \rceil, \quad (4)$$

where $\lfloor x \rceil$ stands for the integer closest to x. An error is made when $\hat{z}_t^{ML} \neq z_t$. The decoding does not depend on earlier decoding decisions, but only on the received symbols $x_{t-1}$ and $x_t$; decoding errors therefore do not propagate.

With regard to models and approximations, it should be noted that differential PSK is a well-known technique used in, among many other applications, voice-band modems operating over fixed channels in which carrier recovery is not desired. Of course, the application to slowly-varying channels follows naturally. Similarly in the extension to multiple antennas given in the next section, one can as a starting point consider a fixed channel. Although the desirability of approximate constancy of fading has been mentioned, it should be understood that such an assumption is not required for effective implementation of the lattice-based decoding of the invention. In the simulation results described herein, actual Jake fading models are utilized by way of example to evaluate the error rate performance.

2. Multiple Antenna Differential Modulation

Figure 1:
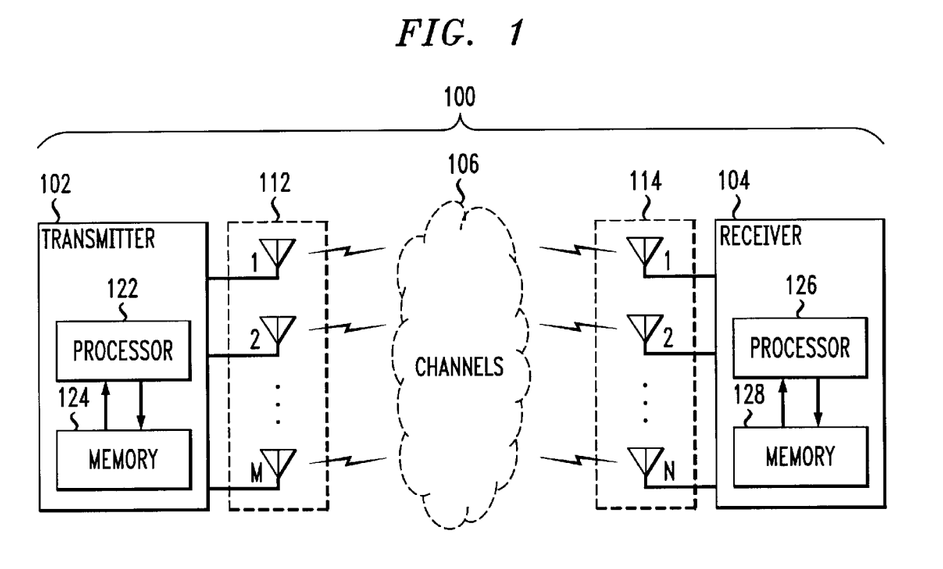
FIG. 1 is a simplified block diagram of an exemplary multiple-antenna wireless communication system in which the invention may be implemented.

FIG. 1 shows an example of a multiple-antenna wireless communication system 100 in which the invention may be implemented. The system 100 includes a transmitter 102 and a receiver 104 which communicate over a set of channels 106. Associated with the transmitter 102 is a set 112 of M transmitter antennas, and associated with the receiver 104 is a set 114 of N receiver antennas. The transmitter 102 includes a processor 122 and a memory 124 which are configured to control various functions of the transmitter 102 in accordance with one or more control mechanisms such as appropriately-configured hardware, firmware or software elements. Similarly, the receiver 104 includes a processor 126 and a memory 128 which are configured to control various functions of the receiver 104 in accordance with one or more of the above-noted control mechanisms. For example, processor 126 and memory 128 may interact to execute stored program instructions for implementing lattice-based decoding of differential symbols received in receiver 104, in a manner to be described in detail below.

2.1 The Rayleigh Flat Fading Channel

Consider a communication link with M transmitter antennas and N receiver antennas, such as that illustrated in conjunction with FIG. 1, operating in a Rayleigh flat-fading environment. Each receiver antenna responds to each transmitter antenna through a statistically independent fading coefficient. The received signals are corrupted by additive noise that is statistically independent among the N receiver antennas and the symbol periods.

For differential modulation, it is convenient to group the signals transmitted over the M antennas in time blocks of size M. We will use $\tau$ to index the time blocks. The transmitted signals are organized in an M×M matrix $S_\tau$ where the column indices represent the different antennas and the row indices represent the time samples $t=\tau M, \ldots, \tau M+M-1$. The matrices are power normalized so that the expected Euclidean norm of each row is equal to one. This way the total transmitted power does not depend on the number of antennas. The received signals are organized in M×N matrices $X_\tau$. Assuming that the fading coefficients are constant within each block of size M, the action of the channel is given by:

$$X_\tau = \sqrt{\rho} S_\tau H_\tau + W_\tau \text{ for } \tau = 0, 1, \ldots \quad (5)$$

Here $W_\tau$ is an M×N matrix of receiver noise coefficients. The noise coefficients are independent across time and receive antennas, and are identically complex normal $C\mathcal{N}(0, 1)$ distributed. The M×N matrix $H_\tau$ contains the fading coefficients; they are $C\mathcal{N}(0, 1)$ distributed and are assumed to be independent of the transmit and receive antennas, but not independent across blocks. Because of the power normalization, $\rho$ is the expected SNR at the receiver.

It should be noted that the normalization used in this illustrative embodiment is different than that described in the above-cited U.S. patent application Ser. No. 09/206,843 and U.S. patent application Ser. No. 09/356,387. More specifically, the latter normalization includes an extra denominator term $\sqrt{M}$ while the rows are normalized to have expected norm M. Clearly, both normalizations imply that the total transmitted power does not depend on the number of antennas.

2.2 Differential Modulation

The generalization of differential modulation to multiple antennas was introduced in the above-cited U.S. patent application Ser. No. 09/356,387. Given that a single block takes up M uses of the channel, a rate R requires $L=2^{RM}$ different signals. Each signal is an M×M unitary matrix $V_l$ from a constellation $\mathcal{V}$ of L such matrices. The bits to be transmitted are packed into an integer data sequence $z_1, z_2, \ldots$ with $z_\tau \in \{0, \ldots, L-1\}$. The fundamental differential encoding equation is given by $$S_\tau = V_{z_\tau} S_{\tau-1} \text{ for } \tau = 1, 2, \ldots \text{ with } S_0 = I. \quad (6)$$

Clearly all $S_\tau$ matrices are unitary as well; hence the power normalization is satisfied. We next assume that the fading coefficients are approximately constant over 2M time samples ($H_{\tau-1} \approx H_\tau$). We can substitute the above equation in (5) to obtain $$X_\tau = V_{z_\tau} X_{\tau-1} + W_\tau - V_{z_\tau} W_{\tau-1}.$$

Because the noise matrices are independent and statistically invariant with respect to multiplication by unitary matrices, we may write this as $$X_\tau = V_{z_\tau} X_{\tau-1} + \sqrt{2} W'_\tau, \quad (7)$$

where $W'_\tau$ is an M×N matrix of additive independent $C\mathcal{N}(0, 1)$ noise. This is the fundamental differential receiver equation. The maximum likelihood (ML) decoder, as described in the above-cited U.S. patent application Ser. No. 09/356, 387, is given by $$\hat{z}_r^{ML} = \arg \min_{l=0,\ldots,L-1} \|X_r - V_l X_{r-1}\|_F, \quad (8)$$

where the matrix norm is the Frobenius norm $$\|A\|_F^2 = tr(A^\dagger A) = tr(AA^\dagger) = \sum_{i=1}^{I} \sum_{j=1}^{J} |a_{ij}|^2. \quad (9)$$

This matrix norm will be used, by way of example, throughout the description.

The quality of a constellation $\mathcal{V}$ is determined by the probability of error of mistaking one symbol of $\mathcal{V}$ for another. In the above-cited U.S. patent application Ser. No. 09/356,387, it is shown that the probability of mistaking a signal $V_l$ for a signal $V_{l'}$ depends dominantly on the absolute value determinant of $V_l - V_{l'}$. In particular, the quality of a constellation $\mathcal{V}$ is measured by the so-called diversity product $$\zeta = \frac{1}{2} \min_{0 \leq l < l' < L} |\det(V_l - V_{l'})|^{1/M}. \quad (10)$$

The diversity product is always between 0 and 1; the closer to 1, the better the error performance. Any constellation with non-zero diversity product is said to have full diversity.

Even though it implies some loss of generality, it is convenient for simplicity and clarity of illustration to let the constellation $\mathcal{V}$ form a commutative group. This is equivalent to letting all $V_l$ be diagonal, with Lth roots of unity on the diagonal, as described in U.S. patent application Ser. No. 09/356,387. In particular $$V_l = V_1^l, \text{ where } V_1 = \text{diag}[e^{i2\pi u_1/L} \ldots e^{i2\pi u_M/L}], 0 \leq l < L,$$

and $u_m$ are integers between 0 and L-1. Without loss of generality, we can let $u_1 = 1$. The constellation is thus entirely defined by the integers $u_2 \ldots u_M$. For a given M, the $u_m$ are chosen to maximize the diversity product $\zeta$ as defined in (10).

Because $\mathcal{V}$ forms a group, every transmitted matrix $S_\tau$ belongs to $\mathcal{V}$. This implies that at any given time only one antenna transmits a PSK symbol. Diagonal constellations are thus very simple to implement.

Figure 2:
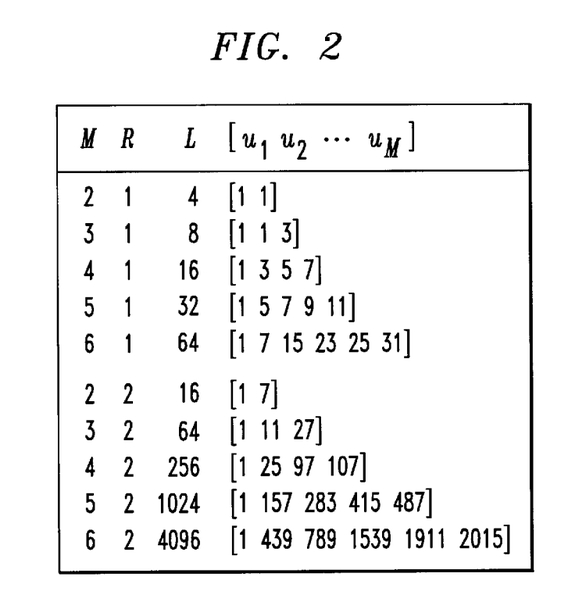
FIG. 2 is a table listing an exemplary set of diagonal constellations suitable for use in conjunction with the invention.

FIG. 2 is a tabular listing showing an example set of diagonal constellations suitable for use in the illustrative embodiment of the invention. The constellations shown are diagonal antenna constellations for M=1, 2, 3, 4 and 5 transmitter antennas and rate R=1, 2 that maximize $\zeta$ in (10). The number of signals in each of the constellations is $L=2^{RM}$. These constellations will be used in the following description. It should be understood, however, that the invention can be implemented using other types of constellations. For example, the invention could be utilized with a modulation constellation which includes diagonal and non-diagonal elements. In this case, the lattice-based decoding techniques of the invention may be utilized to decode the subset of the constellation corresponding to the diagonal elements, while other techniques are used to decode the non-diagonal elements.

2.3 Maximum Likelihood Decoding

For purposes of simplicity and clarity of illustration, we initially focus on the case of N=1 receiver antenna, which is most typical for a mobile setting. We will later describe how to generalize the lattice-based decoding of the invention to N>1, i.e., to multiple receiver antennas. The received signals form a length M vector $X_\tau$ whose elements we denote as $x_{\tau,m}$. The maximum likelihood decoder for diagonal codes can be written as $$\hat{z}_\tau^{ML} = \arg\min_l \|X_\tau - V_l X_{\tau-1}\|_F^2 = \arg\min_l \sum_{m=1}^M |x_{\tau;m} - e^{i2\pi a_m l/L} x_{\tau-1;m}|^2.$$

Using the cosine triangle rule, the summands are equal to $$|x_{\tau;m}|^2 + |x_{\tau-1;m}|^2 - 2|x_{\tau;m} x_{\tau-1;m}| \cos(\arg x_{\tau;m} - \arg x_{\tau-1;m} - 2\pi u_m l/L).$$

Given that only the cosine depends on l the maximum likelihood decoder is equivalent to $$\hat{z}_\tau^{ML} = \arg\max_l \sum_{m=1}^M A_m^2 \cos((u_m l - \varphi_m) 2\pi/L), \quad (11)$$

where $$A_m = |x_{\tau;m} x_{\tau-1;m}|^{1/2} \text{ and } \varphi_m = \arg(x_{\tau;m}/x_{\tau-1;m}) L/(2\pi).$$

Thus, $A_m$ is the geometric mean of the modulus of the signals received from antenna m in block $\tau-1$ and $\tau$, while $\varphi_m$ represents their phase difference in units of $2\pi/L$. We let the "arg" operator take values in $[-\pi, \pi)$ so that $\varphi_m \in [-L/2, L/2)$. Clearly $A_m$ and $\varphi_m$ also depend on $\tau$, but in subsequent description the block index $\tau$ is dropped to simplify notation.

In the one antenna case (M=1 with $u_1=1$), the maximum likelihood decoder can be found at a cost independent of L by rounding $\varphi_l$ to the closest integer, in a manner similar to that described in conjunction with (4) above. However, in a case in which M>1, finding the l that minimizes the above sum is nontrivial. Therefore, earlier approaches such as that described in U.S. patent application Ser. No. 09/356,387 used a brute force search among the $L=2^{RM}$ candidates. The cost of this approach is clearly exponential in both the rate and the number of antennas. The present invention provides a lattice-based decoding technique which finds an approximate solution, avoiding the need for brute force search. This technique is described in detail in the following section.

3. Fast Decoding

It should be noted that a maximization identical to (11) has been used in number theory to disprove the Mertens Conjecture, as is described in detail in A. M. Odlyzko and A. J. J. te Riele, "Disproof of the Mertens conjecture," J. Reine Angew. Math., No. 357, pp. 138–160, 1985. Also, in order to quickly find approximate solutions, this number theory maximization uses a lattice reduction method.

3.1 Constellations as Lattices

We first define a lattice in $R^M$ as the set of all points $$\left\{ \sum_{m=1}^M a_m b_m \,\middle|\, a_m \in Z \right\},$$

where $\{b_1, \ldots, b_M\}$ is a set of independent vectors in $R^M$, called the basis of the lattice. We will use bold to denote vectors in $R^M$.

An important insight is that diagonal constellations can be thought of as M-dimensional lattices. This comes from the fact that the cosine functions in (11) are $2\pi$ periodic and the arguments thus can be reduced to the interval $[-\pi, \pi)$. To do so, we use a symmetric modulo operation, denoted as mod*, where mod* x has range $[-x/2, x/2)$ instead of the usual $[0, x)$. The arguments of the cosine can now be written as $$[(u_m l - \varphi_m) \bmod^* L] 2\pi/L.$$

Define the M-vector $u=[u_1 \ldots u_M]^t$ and let $e_m$ be the standard unit vectors in $R^M$. The vectors lu mod* L for $0 \leq l < L$ form the part of a lattice which lies in $[-L/2, L/2)^M$. To bring the component $lu_m$ in the range $[-L/2, L/2)$ we simply need to add an integer multiple of L. This is equivalent to adding an integer multiple of the vector $Le_m$ to lu. Thus the lattice is formed by taking integer linear combinations of the vector u and the vectors $Le_m$. A basis for the lattice is formed by u and $Le_m$ for $2 \leq m \leq M$.

Figure 3:
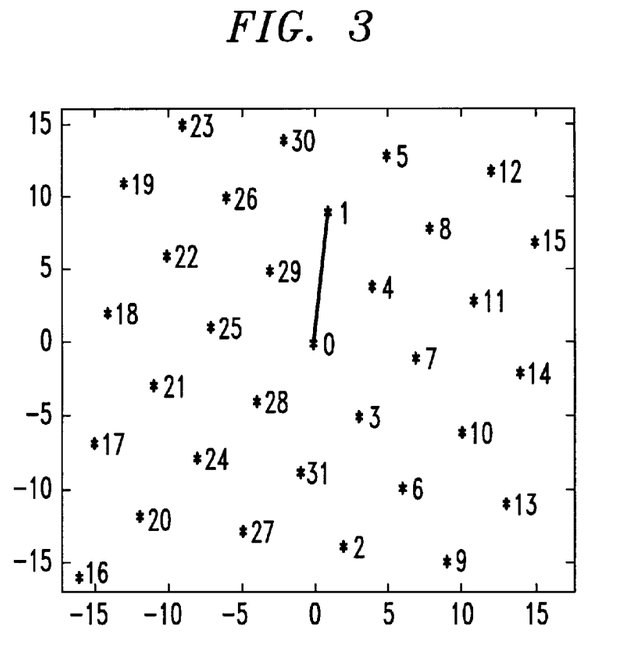
FIG. 3 shows an example illustrating a lattice corresponding to a particular diagonal constellation suitable for use in the system of FIG. 1.

FIG. 3 shows an example illustrating the manner in which diagonal constellations can be viewed as lattices. This is an example in M=2 dimensions where $u=[1\ 9]^t$ and L=32. There are 32 vectors in the square $[-16, 15]^2$, as shown in the figure. The element $V_l$ of the constellation is represented by the vector $l[1\ 9]^t$ mod*32. The lattice is generated by summing integer multiples of the vectors $$\begin{bmatrix} 1 \\ u_2 \end{bmatrix} \begin{bmatrix} 0 \\ L \end{bmatrix} \begin{bmatrix} L \\ 0 \end{bmatrix}.$$

It is clear from the above that the first two vectors form a basis, as L times the first one minus $u_2$ times the second is the third.

3.2 Approximation of the Cosine

As mentioned above, we can restrict the arguments of the cosines in (11) to a interval $[-\pi, \pi)$ around zero. Thus maximizing a cosine is equivalent to forcing its argument to be close to zero. For arguments $\alpha$ close to zero the cosine can be approximated as:

$$\cos(\alpha) \approx 1 - \frac{\alpha^2}{2}.$$

Hence we can approximate the maximization of (11) by a minimizing of the sum of the squares of the arguments of the cosines. Then the expression becomes the square of a Euclidean distance. We denote the index which minimizes this approximate likelihood as $\hat{z}^{eucl}$:

$$z^{eucl} = \underset{l}{\operatorname{argmin}} \sum_m A_m((u_m l - \varphi_m) \bmod * L)^2 =$$

$$\underset{l}{\operatorname{argmin}} \sum_m ((A_m u_m l - A_m \varphi_m) \bmod * A_m L)^2.$$

The vectors with components $A_m u_m l \bmod^* A_m L$ form a lattice, which is the above lattice in which each dimension m has been scaled by $A_m$. Define the diagonal matrix A as $$A = \operatorname{diag} [A_1 \ldots A_m].$$

The lattice is generated by the basis $b_1 = Au$ and $b_m = A_m e_m$ for $2 \leq m \leq M$. Consider the vector y with components $A_m \varphi_m$. We can think of $z^{eucl}$ as the index of the lattice vector closest to y in $R^M$. This implies that we have transformed the differential decoding problem to the well-known problem of finding the closest vector in a lattice.

Figure 4:
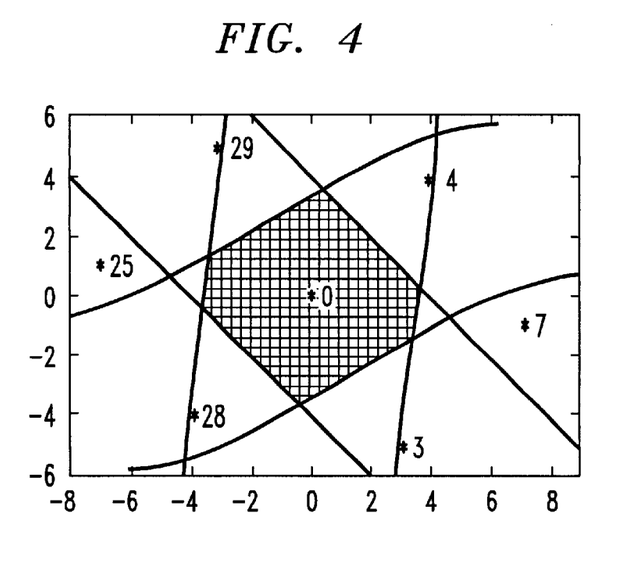
FIG. 4 shows an example of a cosine approximation for the lattice of FIG. 3.

FIG. 4 shows an example of the cosine approximation for the lattice of FIG. 3. Assuming that $A_1 = A_2 = 1$, the shaded region represents the points y for which the maximum likelihood decoder returns the origin ($z^{ML} = 0$). This region is also referred to as the maximum likelihood Voronoi cell. It is found by drawing the curves of points y for which two lattice points have the same likelihood. For example, for lattice points l=0 and l=7 this is the nearly vertical curved line between these lattice points in the figure. When using the Euclidean approximation, these curved lines become straight lines and the Voronoi cell becomes an exact polygon. In this example, the Euclidean and maximum likelihood Voronoi cells are virtually indistinguishable. However, in higher dimensions they may differ more.

3.3 Finding the Closest Point in a Lattice

Approximating the maximum likelihood decoding with a closest point in a lattice does not immediately lead to a fast algorithm. Finding the closest point in a lattice is a so-called NP-hard problem, as described in, e.g., P. van Emde Boas, "Another NP-complete problem and the complexity of computing short vectors in a lattice," Tech. Rep. 81-04, Math. Inst. Univ. Amsterdam, 1981. Thus any known algorithm for finding the closest point in a lattice will be exponential in the number of dimensions M.

However, the present invention has recognized that there is a well-known polynomial-time approximation algorithm introduced in A. K. Lenstra, H. W. Lenstra, and L. Lovász, "Factoring polynomials with rational coefficients," Math. Ann., pp. 515–534, 1982. This approximation uses a technique called basis reduction, and more specifically referred to as the LLL algorithm. The LLL algorithm relies on the observation that when a lattice has an orthogonal basis, the closest point can be found trivially by rounding each component to the closest lattice component. Thus for a given lattice the LLL algorithm attempts to find the "most orthogonal" basis, or more precisely the basis with the shortest vectors, and then uses component-wise rounding to find the closest lattice point. Finding the basis with the shortest vectors itself is a NP-hard problem; the LLL algorithm tries to find a basis with reasonably short vectors.

Figure 5:
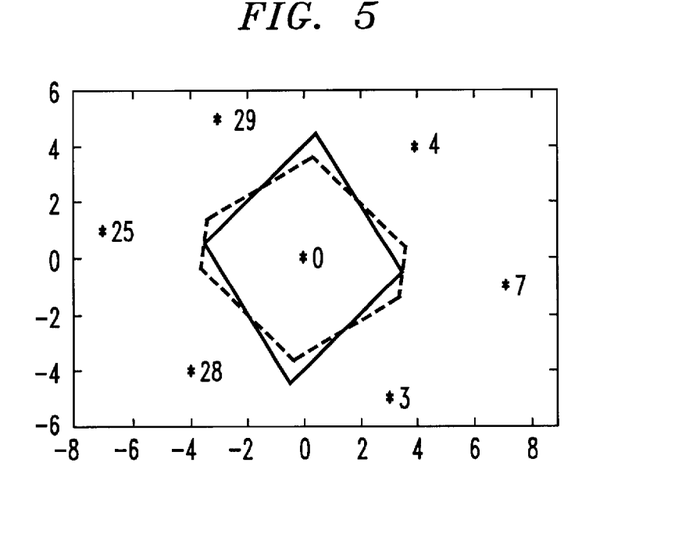
FIG. 5 shows a close-up view of a portion of the lattice of FIG. 3.

FIG. 5 shows a close-up view of a portion of the lattice of FIG. 3. The Euclidean Voronoi cell of the origin, i.e., the region for which the origin is the closest lattice point, is the dashed polygon shown in the figure. The original basis is $[1\ 9]^t$ and $[0\ 32]^t$. The vectors $[4\ 4]^t$ (l=4) and $[3\text{-}5]^t$ (l=3) are the shortest vectors and form a basis. The solid diamond is the region for which component-wise rounding decides the origin is the closest point. Both the dashed polygon and the solid diamond corresponding to the true Voronoi cell have an area of 32. The overlap between these two regions is 90.2%. Thus, for a uniform distribution of query points, component-wise rounding would fail in 9.8% of the queries. However, the distribution of the query points is typically highly peaked around the lattice points, and the performance of component-wise rounding can be much better. In higher dimensions, the overlap between the two regions can be much less.

3.4 The LLL Algorithm

A brief description of the above-noted basis reduction algorithm will now be provided. Additional details can be found in the above-cited LLL reference. It should be understood, however, that the invention may also be implemented using algorithms not involving basis reduction, as well as any other algorithm suitable for finding the closest point in a lattice.

Let $b_1 \ldots b_M$ denote the original basis of the lattice as given above. The basis reduction algorithm does a series of operations of the form $b_i - b_i + ab_j$, for integer a; such operations yield a different basis for the same lattice. The operations are intended to make the vectors "more orthogonal" to each other. To do these operations, the LLL algorithm uses a set of orthogonal vectors $\hat{b}_1 \ldots \hat{b}_M$, obtained by Gram-Schmidt orthogonalization of the original basis. The result of the LLL algorithm is that, for i=1 . . . M, $$b_i = \hat{b}_i + \sum_{1 \leq j < i} \alpha_{ij} \hat{b}_j, \tag{12}$$

where the coefficients $\alpha_{ij}$ have $|\alpha_{ij}| \leq \tfrac{1}{2}$. An additional key property is that $$\hat{b}_i^2 \geq \hat{b}_{i-1}^2 / 2, \tag{13}$$

for i=2 . . . M, where $\hat{b}_i^2$ denotes $\hat{b}_i \cdot \hat{b}_i = \|\hat{b}_i\|^2$. That is, an output lattice vector $b_i$ can be expressed as a sum in which the orthogonal vector $\hat{b}_i$ dominates, in a sense, and in which the orthogonal vectors $\hat{b}_i$ are not too far apart in size. A basis satisfying the two given properties is said to be a reduced basis.

One basic operation in building a reduced basis is the following: for a given $b_i$, suppose (12) holds for $b_1 \ldots b_{i-1}$. Now for j=i-1 down to 1, set $b_i - b_i - \lfloor b_i \cdot \hat{b}_j / \hat{b}_j^2 \rceil b_j$, where, as previously noted, $\lfloor x \rceil$ denotes x rounded to the nearest integer. Note that $(b_i \cdot \hat{b}_j / \hat{b}_j^2) \hat{b}_j$ is the $\hat{b}_j$—component of $b_i$, so with the rounding, we are removing that component, up to some $\alpha_{ij} \hat{b}_j$ with $|\alpha_{ij}| \leq \tfrac{1}{2}$. Moreover, the use of $b_j$ in place of $\hat{b}_j$ doesn't change this, by (12), and by performing these steps in decreasing j order, any $b_j$-components of $b_j$ that are added to $b_i$ are removed later. Note that these steps leave $b_i$ a member of the lattice.

Call such an operation on $b_i$ the weak reduction of $b_i$, by $b_1 \ldots b_{i-1}$. Clearly by doing weak reduction of $b_1 \ldots b_M$, condition (12) will hold for the basis. To obtain Gram-Schmidt vector $\hat{b}_i$, begin with $b_i$, and do a similar reduction step, but without the rounding. To achieve the condition (13), check if there is some i with $$\hat{b}_i^2 > \frac{4}{3} \left( \hat{b}_{i+1}^2 + \alpha_{i+1,i} \hat{b}_i^2 \right) \tag{14}$$

If so, interchange $b_i$ and $b_{i-1}$, and then do weak reductions and updating of Gram-Schmidt vectors. This step is repeated until no interchanges are done. It can be shown that the resulting basis satisfies (12) and (13), and so is reduced. Moreover, the number of steps needed can be bounded as well.

Figure 6:
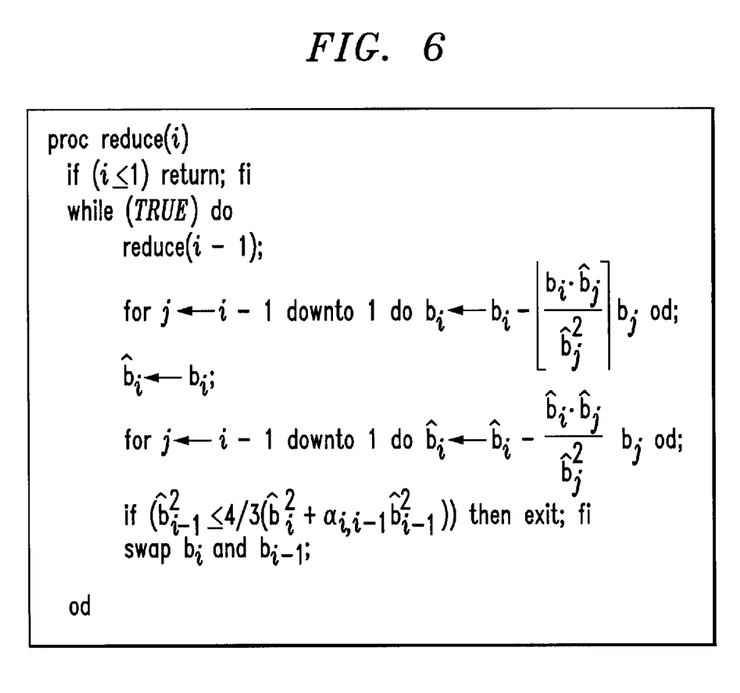
FIG. 6 shows pseudocode for a basis reduction algorithm suitable for use in conjunction with the invention.

FIG. 6 shows a set of pseudocode implementing a recursive version of the above-described basis reduction procedure.

Now assume we are given a vector y, and we want to find the integer combination of the basis vectors $b_1 \ldots b_M$ that is closest to y. We simply perform a weak reduction step for y using $b_1 \ldots b_M$. The total of the subtracted vectors is a lattice element y' that is near to y. More particularly, $$x \equiv y - y' = \sum_i \lambda_i \hat{b}_i \qquad (15)$$

where $|\lambda_i| \leq \frac{1}{2}$. Then y' will be the estimate of the closest lattice point. Now y' is equal to lu for some l. Because $u_1=1$, we can find the approximate decoding answer as $$\hat{z}^{latt} = y'_1 \bmod L.$$

In summary, there are three components that make the lattice-based decoding of the present invention an approximate approach:

1. The cosine approximation, i.e., $\hat{z}^{eucl}$ need not be $\hat{z}^{ML}$. In other words, the M-dimensional polyhedral Euclidean Voronoi cell does not coincide exactly with the curved maximum likelihood cell.

2. In the basis with the shortest possible vectors, the M-dimensional polyhedral Euclidean Voronoi cell is approximated by a M-dimensional parallelepiped.

3. The LLL algorithm does not necessarily find the basis with the shortest possible vectors.

3.5 An Exact Algorithm

This subsection shows that it is possible to apply basis reduction techniques to solve the closest-point problem exactly, in polynomial time for fixed dimension. The main idea is that while the above component-wise rounding is not sufficient to get the exact answer, we can show that not too many different coordinate values need be considered to obtain the closest lattice point. The algorithm we describe below for proving this complexity bound shows that the difficulty of the problem is related to the dimension, not the size of L. A similar result is already known for the problem of finding the shortest vector in a lattice, as described in L. Lovász, "An Algorithmic Theory of Numbers, Graphs, and Convexity," Society for Industrial and Applied Mathematics, Philadelphia, Pa., 1986.

Assume we are given a vector y, and we want to find the nearest vector in the lattice. As described above, we perform a weak reduction step for y using $b_1 \ldots b_M$, to obtain lattice element y'. This leaves the problem of finding the lattice point nearest to the vector x=y−y'.

It can be shown that a lattice point z closest to x can be expressed as $z = \Sigma_i \alpha_i b_i$, where $|\alpha_M| \leq 2^{M/2}$. This bound, and some brute-force searching, yield the following algorithm: for $k=-2^{(M-1)/2} \ldots 2^{(M-1)/2}$, recursively search for the closest lattice point to x, subject to the condition that the point has form $kb_M + \Sigma_{i<M} \alpha_i b_i$. Equivalently, let $x' = x - kb_M$, and look for the closest point to x' in the lattice generated by $\{b_1 \ldots b_{M-1}\}$.

To prove the bound on the size of $\alpha_M$, note that (13) implies that $\hat{b}_M^2 \geq \hat{b}_i^2/2^{M-i}$. We have also $x^2 \leq \Sigma_i \hat{b}_i^2/4$ from (15), and $z^2 \leq 4x^2$, since z must be at least as close to x as the origin. We have $$2^M \hat{b}_M^2 \geq \sum_i \hat{b}_i^2 \geq 4x^2 \geq z^2 \geq \alpha_M^2 \hat{b}_M^2,$$

and so $\alpha_M^2 \leq 2^M$, yielding the above-noted bound regarding the lattice point z.

In the recursive application of the algorithm, note that by the construction of the orthogonalization, we can use $x' - (x' \cdot \hat{b}_M/\hat{b}_M^2)\hat{b}_M$ and get the same answer. That is, we can ignore $\lambda_M$, and the subproblem is (M−1)-dimensional; thus a recursive solution will satisfy the relevant conditions and it is enough to consider coefficients $\alpha_i$ with $\alpha_i^2 \leq 2^i$.

The resulting algorithm has a running time proportional to $2^{(M+1)M/4+M}$, but polynomial in the other parameters, i.e., rate and length of the operands.

3.6 Extensions

The above-described lattice-based decoding of the present invention can also be used in other settings. Two examples are a multiple-antenna receiver and the general unknown channel case.

In the multiple-antenna receiver case, there are N receivers, the received symbol $X_\tau$ is an M×N matrix with elements $x_{\tau,m,n}$. The maximum likelihood decoder is now given by $$\hat{z}_\tau^{ML} = \arg\min_l \|X_\tau - V_l X_{\tau-1}\|_F^2 = \arg\min_l \sum_{n=1}^N \sum_{m=1}^M |x_{\tau;m,n} - e^{i2\pi a_m l/L} x_{\tau-1;m,n}|^2.$$

This in turn can be written as $$\hat{z}_\tau^{ML} = \arg\max_l \sum_{n=1}^N \sum_{m=1}^M A_{m,n}^2 \cos((u_m l - \varphi_{m,n})2\pi/L) \qquad (16)$$

where $$A_{m,n} = |x_{\tau;m,n} x_{\tau-1;m,n}|^{1/2} \text{ and } \partial_{m,n} = \arg(x_{\tau;m,n}/x_{\tau-1;m,n})L/(2\pi).$$

The maximization (16) is formally similar to the one in (11). Using the same cosine approximation as before, the decoding problem can be recast as determining a closest point in a lattice of MN dimensions, and the approximate lattice decoding approach of the invention can be applied in a straightforward manner.

Extension to the unknown channel case will now be described. The differential setting is a special case of the more general unknown channel setting described in T. L. Marzetta and B. M. Hochwald, "Capacity of a mobile multiple-antenna communication link in Rayleigh flat fading," IEEE Trans. Inf. Theory, vol. 45, pp. 139–157, 1999. The fading in this more general case is assumed to be constant over T symbol periods where T>M. The transmitted signal is now an oblong T×M matrix Φ with orthogonal columns. For one receiver antenna the received signal X is a T dimensional vector. In U.S. patent application Ser. No. 09/206,843, systematic constellations $\Phi_l$ with $0 \leq l < L$ are constructed as $$\Phi_l = \Theta^l \Phi_0,$$

where Θ is a T×T diagonal unitary matrix with diagonal elements $e^{i2\pi u_t/L}$ with $1 \leq t \leq T$. The diagonal differential setting is a special case where T=2M and $\Phi_0$ consists of two M×M identity matrices. The maximum likelihood decoding is given by $$\hat{z}^{ML} = \arg\max_l \|X * \Phi_l\|_F.$$

Denote the elements of X as $x_l$ and those of $\Phi_0$ as $\phi_{t,m}$. Then $$\|X * \Theta^l \Phi_0\|_F^2 = \sum_{m=1}^M \left|\sum_t x_t^* e^{i2\pi u_t l/L} \varphi_{t,m}\right|^2$$

$$= \sum_{m=1}^M \sum_{t=1}^T x_t^* e^{i2\pi u_t l/L} \varphi_{t,m} \sum_{t'=1}^T x_{t'} e^{-i2\pi u_{t'} l/L} \varphi_{t',m}^*$$

$$= \sum_{t=1}^T \sum_{t'=1}^T x_t^* x_{t'} e^{i2\pi(u_t - u_{t'})l/L} p_{t,t'} \text{ with}$$

$$p_{t,t'} = \sum_{m=1}^M \varphi_{t,m} \varphi_{t',m}^*$$

$$= \sum_{t=1}^T \sum_{t'=1}^T |x_t x_{t'} p_{t,t'}| \cos(\arg p_{t,t'} - \arg x_t +$$

$$\arg x_{t'} + 2\pi(u_t - u_{t'})l/L).$$

The terms with t=t' do not depend on l, so $$\hat{z}^{ML} = \arg\max_l \sum_{t=1}^T \sum_{t'=t-1}^T A_{t,t'}^2 \cos(v_{t,t'} l - \theta_{t,t'}) 2\pi/L,$$

where $$v_{t,t'} = u_t - u_{t'}, A_{t,t'} = |x_t x_{t'} p_{t,t'}|^{1/2} \text{ and } \theta_{t,t'} = (\arg x_t - \arg x_{t'} - \arg p_{t,t'})L/(2\pi).$$

The above minimization again is formally similar to (11), and we thus can use the previously-described lattice algorithm for fast approximate decoding. In general, the matrix $P=[p_{t,t'}]=\Phi_0 \Phi_0^*$ is full and we end up with a lattice in T(T−1)/2 dimensions. For N receive antennas we would end up with NT(T−1)/2 dimensions.

It can be seen that both using more receive antennas and going to the more general unknown channel case increases the dimension of the lattice. For increasing dimensions, brute force search algorithms quickly become unusable, while fast approximate algorithms like LLL continue to perform well.

4. Results

A number of software simulations have been performed to illustrate the performance capabilities of an illustrative embodiment of the invention relative to conventional maximum likelihood decoding. The results of these simulations will be described with reference to FIGS. 7 and 8.

Figure 7:
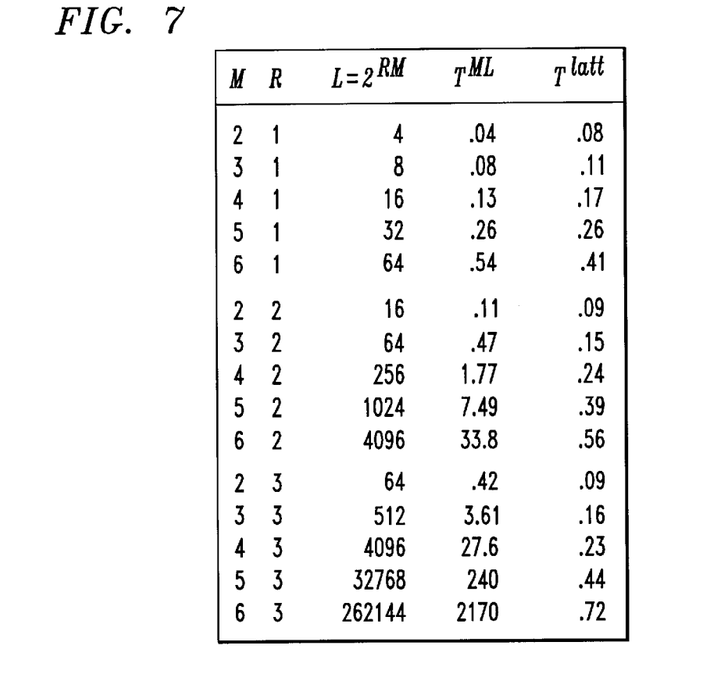
FIG. 7 is a table listing running time results for conventional maximum likelihood decoding and an illustrative embodiment of lattice-based decoding in accordance with the invention.

FIG. 7 is a table comparing the performance of lattice-based decoding in an illustrative embodiment of the invention with conventional maximum likelihood decoding. The performance was simulated for a single receiver antenna case, using the exemplary diagonal constellations described previously in conjunction with FIG. 2. The table shows the running times in milliseconds for software implementations of conventional brute force maximum likelihood decoding ($T^{ML}$) and lattice-based decoding in accordance with the invention ($T^{latt}$). These exemplary implementations used C++ code with an STL template library and ran on an SGI R10000 processor operating at 195 MHz.

It can be seen from the table that for a rate R=1, the lattice-based decoding is faster than conventional ML decoding for diagonal constellations having more than 32 symbols. For rates of R=2 and higher, the lattice-based decoding is faster than conventional ML decoding for all diagonal constellations considered. Even for diagonal constellations with over 200K symbols, the lattice-base decoding in these simulations finishes in less than a millisecond.

It is also apparent from the table that the running time of the lattice-based decoding depends much less on the rate then it does on the number of antennas. This is partly because the cost of the operation in software is independent on the lengths of the operands. It is expected that further improvements in running time performance could be obtained by, e.g., configuring an optimized fixed-length vector allocation routine for a system with a fixed number of antennas. Moreover, an optimized software or hardware implementation can be configured to run in real time. For example, for real time decoding at a sample rate of 30 kHz, one has to be able to run the decoding algorithm in M×0.03 milliseconds.

Figure 8:
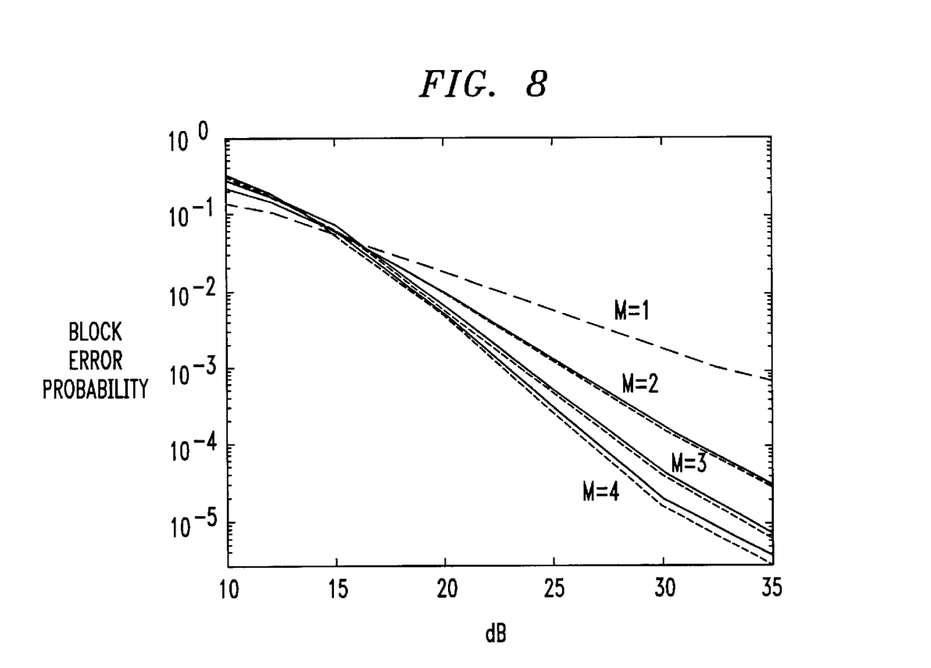
FIG. 8 is a plot comparing error rate performance results for conventional maximum likelihood decoding and an illustrative embodiment of lattice-based decoding in accordance with the invention.

FIG. 8 compares plots of block error performance for conventional ML decoding and lattice-based decoding for values of M=2, 3 and 4. For each of these cases, the lattice-based decoding plot is shown as a solid line, while the corresponding ML decoding plot is shown as a dotted line. A plot for single-antenna DPSK decoding, corresponding to the dashed line labeled M=1, is also included for purposes of comparison. In all cases, the rate R=2. The diagonal codes used are those given in the table of FIG. 2.

The block error rate in these examples was computed as the relative number of times that $\hat{z}_\tau^{ML}$ or $\hat{z}_\tau^{latt}$ is not equal to $z_\tau$. The fading per antenna is correlated in time according to the model described in W. C. Jakes, "Microwave Mobile Communications," IEEE Press, Piscataway, N.J., 1993. It is assumed that the carrier is 900 MHz, the sampling rate is 30 kHz, and the mobile receiver moves at 55 mph. The Jakes correlation after t time samples then is $J_0(2\pi 0.0025 t)$, where $J_0$ is the zero-order Bessel function of the first kind.

It is apparent from FIG. 8 that the error performance of the lattice-based decoding is very close the that of conventional ML decoding. More particularly, the lattice-base decoding is between about 1% worse for low SNR to about 10% worse for high SNR. As already observed in U.S. patent application Ser. No. 09/206,843 and U.S. patent application Ser. No. 09/356,387, the error rate drops significantly when going to multiple antennas.

It should again be noted that the above-described embodiments of the invention are illustrative only. Numerous alternative embodiments can be configured.

For example, it may be possible to obtain a better basis than that provided by the above-described implementation of the LLL algorithm by replacing the value 4/3 in (14) with a value closer to 1. This makes the output basis more orthogonal, at the cost of more iterations of the reduction algorithm. The number of iterations could be bounded at some fixed limit to assure that decoding is not too slow. It may also be possible to incorporate the cosine measure into the closest vector calculation, using a small amount of local search. Numerous other implementations of basis reduction algorithms may be used in conjunction with the invention.

Other alternative embodiments may use other types of diagonal codes. By considering the connection with lattices, additional insight into the design of appropriate diagonal codes is provided. For example, one can approximately relate the diversity product of a diagonal code to the minimum distance between two lattice points.

The interpretation of diagonal codes as lattices can also be used to determine appropriate bit allocation techniques, e.g., the assignment of bit sequences to each of the L symbols.

Although illustrated herein using differential detection, the invention may also be used in conjunction with non-differential detection, e.g., in an application in which channel characteristics are known. The lattice-based decoding techniques of the invention may thus be applied to the decoding of non-differential symbols.

It should also be noted that the lattice-based decoding techniques of the invention may be applied to only a subset of a modulation constellation, rather than to an entire constellation. In this case, the subset of the constellation may be characterized as a lattice with decoding performed using the lattice-based techniques of the invention, while other portions of the constellation are decoded using other techniques.

The invention may be implemented in numerous communication applications other than those described herein, and can be applied to the multiple-antenna transmission and reception of data, speech, audio, video or any other desired type of information. These and numerous other alternative embodiments and implementations within the scope of the following claims will be apparent to those skilled in the art.

What is claimed is:

1. A method of decoding received signals in a multiple-antenna communication system, the method comprising the steps of:

receiving one or more symbols; and implementing a decoding operation for the received symbols at least in part as a determination of a closest point in a lattice corresponding to at least a subset of a modulation constellation used to generate the symbols;

the decoding operation utilizing a basis reduction algorithm to determine an approximately orthogonal basis for the lattice, the closest point being determined based at least in part on component-wise rounding using the orthogonal basis.

2. The method of claim 1 wherein the received symbols comprise differential symbols and the decoding operation comprises a differential decoding operation.

3. The method of claim 1 wherein the received symbols comprise non-differential symbols and the decoding operation comprises a non-differential decoding operation.

4. The method of claim 1 wherein a given communication link of the multiple-antenna system comprises a plurality of transmitter antennas and a single receiver antenna.

5. The method of claim 1 wherein a given communication link of the multiple-antenna system comprises a plurality of transmitter antennas and a plurality of receiver antennas.

6. The method of claim 1 wherein the modulation constellation comprises a diagonal modulation constellation.

7. The method of claim 1 wherein the lattice is an approximation to a lattice having orthogonal dimensions.

8. The method of claim 1 wherein the lattice is an M-dimensional lattice, and a given communication link of the multiple-antenna system comprises M transmitter antennas.

9. The method of claim 1 wherein the basis reduction algorithm comprises an LLL algorithm.

10. The method of claim 1 wherein the decoding operation has a complexity which is polynomial in the particular number of multiple antennas of the system.

11. The method of claim 1 wherein the decoding operation has a complexity which is polynomial in the rate of the system.

12. The method of claim 1 wherein the decoding operation provides a level of error performance which approximates a level of error performance provided by a maximum likelihood estimation algorithm.

13. An apparatus for decoding received signals in a multiple-antenna communication system, the apparatus comprising:

a receiver operative to receive one or more symbols, and to implement a decoding operation for the received symbols at least in part as a determination of a closest point in a lattice corresponding to at least a subset of a modulation constellation used to generate the symbols;

the decoding operation utilizing a basis reduction algorithm to determine an approximately orthogonal basis for the lattice, the closest point being determined based at least in part on component-wise rounding using the orthogonal basis.

14. The apparatus of claim 13 wherein the received symbols comprise differential symbols and the decoding operation comprises a differential decoding operation.

15. The apparatus of claim 13 wherein the received symbols comprise non-differential symbols and the decoding operation comprises a non-differential decoding operation.

16. The apparatus of claim 13 wherein a given communication link of the multiple-antenna system comprises a plurality of transmitter antennas and a single receiver antenna.

17. The apparatus of claim 13 wherein a given communication link of the multiple-antenna system comprises a plurality of transmitter antennas and a plurality of receiver antennas.

18. The apparatus of claim 13 wherein the modulation constellation comprises a diagonal modulation constellation.

19. The apparatus of claim 13 wherein the lattice is an approximation to a lattice having orthogonal dimensions.

20. The apparatus of claim 13 wherein the lattice is an M-dimensional lattice, and a given communication link of the multiple-antenna system comprises M transmitter antennas.

21. The apparatus of claim 13 wherein the basis reduction algorithm comprises an LLL algorithm.

22. The apparatus of claim 13 wherein the decoding operation has a complexity which is polynomial in the particular number of multiple antennas of the system.

23. The apparatus of claim 13 wherein the decoding operation has a complexity which is polynomial in the rate of the system.

24. The apparatus of claim 13 wherein the decoding operation provides a level of error performance which approximates a level of error performance provided by a maximum likelihood estimation algorithm.

* * * * *